US012776456B2

(12) United States Patent
Peters et al.

(10) Patent No.: US 12,776,456 B2

(45) Date of Patent: Oct. 27, 2026

(54) DISCONNECTOR OR EARTHING SWITCH

(71) Applicant: Hitachi Energy Ltd, Zürich (CH)

(72) Inventors: Hauke Peters, Hanau (DE); Dennis Goth, Obrigheim (DE)

(73) Assignee: Hitachi Energy Ltd, Zürich (CH)

( * ) Notice: Subject to any disclaimer, the term of this patent is extended or adjusted under 35 U.S.C. 154(b) by 229 days.

(21) Appl. No.: 18/538,092

(22) Filed: Dec. 13, 2023

(65) Prior Publication Data

US 2024/0203670 A1 Jun. 20, 2024

(30) Foreign Application Priority Data

Dec. 16, 2022 (EP) .................................... 22214242

(51) Int. Cl.
*H01H 3/40* (2006.01)

(52) U.S. Cl.
CPC .................................... *H01H 3/40* (2013.01)

(58) Field of Classification Search
CPC .. H01H 3/40; H01H 2001/50; H01H 2003/02; H01H 2003/32; H01H 2221/024; H01H 33/42; H01H 33/48; H01H 33/122; H01H 31/00; H01H 31/003; H01H 31/02; H01H 31/26; H01H 31/32; H01H 31/36; H01H 31/40; H01H 1/12; H01H 3/00; H01H 3/02; H01H 3/32; H01H 63/00
USPC .......................................................... 200/501
See application file for complete search history.

(56) References Cited

U.S. PATENT DOCUMENTS 10,304,640 B2 5/2019 Chen et al.

FOREIGN PATENT DOCUMENTS

| | | | |
|---|---|---|---|
| CN | 112201529 | A | 1/2021 |
| EP | 4089698 | A1 | 11/2022 |
| GB | 2520528 | A | 5/2015 |
| JP | S52120962 | U | 9/1977 |
| JP | S5565723 | U | 5/1980 |
| JP | 6988951 | B2 | 1/2022 |
| WO | 2011031033 | A2 | 3/2011 |

OTHER PUBLICATIONS

Office Action, Japanese Patent Application No. 2023-205354, mailed Feb. 4, 2025, 10 pages.
Extended European Search Report, European Application No. 22214242.4, mailed Jul. 7, 2023, 8 pages.
Office Action, Indian Patent Application No. 202344084266, mailed May 7, 2026, 11 pages.

*Primary Examiner* — Anthony R Jimenez
(74) *Attorney, Agent, or Firm* — Sage Patent Group

(57) ABSTRACT

A disconnector or earthing switch for connecting three conductors of different phases to a respective switching tube, including a rotatable drive shaft including a worm and configured for operating the disconnector or earthing switch, the three respective switching tubes, which are arranged axially together movable between a connected position configured for connecting the three conductors and a disconnected position configured for not connecting the three conductors, a partially toothed worm wheel configured for translating a rotation of the worm into the axial movement of the three switching tubes between the connected position and the disconnected position, whereby the partially toothed worm wheel is unengaged with the worm in the connected position and the disconnected position, and a re-engagement device configured for again engaging the partially toothed worm wheel with the worm in the connected position and the disconnected position.

20 Claims, 5 Drawing Sheets

DISCONNECTOR OR EARTHING SWITCH

CROSS REFERENCE TO RELATED APPLICATION

This application claims priority to European Patent Application Number 22214242.4, filed on Dec. 16, 2022, the disclosure and content of which is incorporated by reference herein in its entirety.

TECHNICAL FIELD

The disclosure relates to a disconnector or earthing switch for connecting three conductors of different phases to a respective switching tube, comprising a rotatable drive shaft comprising a worm and configured for operating the earthing switch and the three respective switching tubes, which are arranged axially together movable between a connected position configured for connecting the three conductors and a disconnected position configured for not connecting the three conductors.

BACKGROUND ART

A disconnector or earthing switch, also known a grounding switch, is a protective device included in switchgear components like circuit breakers and isolators. When circuit breakers are removed and racked out, earthing switches automatically ground a part of a bus bar adjacent to the circuit breakers. For isolators, the earthing switches make contact with the bus bar when the isolator isolates the circuits, discharging any charges that may have gathered there. For example, an earthing switch in switchgear is used to ground a remaining change in a power line after the power line has been removed from its source. A residual charge often remains in a circuit after it has been severed or opened by the circuit breaker and isolator. An earthing switch is usually provided to discharge the charge.

Disconnector or earthing switches often have a snap action closing mechanism for protecting technicians and staff when there is an abnormal current. Generally, disconnector or earthing switches are designed to withstand short circuits. The disconnector or earthing switch in a substation has an ability to create short circuits in order to safeguard other electrical devices from damage. The disconnector or earthing switch is often used with several high-voltage switchgear and also serves as a protective device in an overhaul of high-voltage electrical equipment.

Such disconnector or earthing switch can be motorized or manually operated. When a drive of the disconnector or earthing switch is operated by motor, end switches must be present for delimit traverse of an operating mechanism actuated by the motor. During hand operation defined end positions need to be defined. However, prior art solutions unfortunately do not provide sufficiently secure and easy operation mechanism for actuating such disconnector or earthing switch.

SUMMARY OF THE DISCLOSURE

It is therefore an object of the disclosure to provide an improved operation mechanism for activating a disconnector or earthing switch The object of the disclosure is solved by the features of the independent claims. Preferred implementations are detailed in the dependent claims.

Thus, the object is solved by an in particular high voltage disconnector or earthing switch for connecting three conductors of different phases to a respective switching tube, comprising

- a rotatable drive shaft comprising a worm and configured for operating the disconnector or earthing switch,
- the three respective switching tubes, which are arranged axially together movable between a connected position configured for connecting the three conductors and a disconnected position configured for not connecting the three conductors,
- a partially toothed worm wheel configured for translating a rotation of the worm into the axial movement of the three switching tubes between the connected position and the disconnected position, whereby the partially toothed worm wheel is unengaged with the worm in the connected position and the disconnected position, and
- a re-engagement device configured for again engaging the partially toothed worm wheel with the worm in particular in the connected position and the disconnected position.

The proposed solution thus constitutes a kind of position-controlled freewheel, acting in directions of rotation of the partially toothed worm wheel. The voltage disconnector or earthing switch allows transmitting high torques and at a same time providing said freewheel function in a very small installation space. Thereby, the function of the proposed freewheel is based on the principle of geometrically controlled decoupling of two gearing partners, namely the partially toothed worm wheel and the rotatable drive shaft. Thus, torque and rotary motion are only transmitted for a defined range of motion between the rotatable drive shaft and the partially toothed worm wheel.

Compared to freewheels known from prior art whose function is based on friction between bodies, the proposed freewheel operates purely kinematically. Therefore, environmental factors and aging of lubricants on the function of the freewheel does not influence operation. The proposed freewheel composed of the rotatable drive shaft and the partially toothed worm wheel can be used as a safety device to safeguard a motor-driven mechanism in end positions in addition to electrical shutdown devices, for example limit switches, and for decoupling input and output sides mechanically precisely, without an influence of a coasting behaviour of the motor.

In addition, when a mechanism for connecting three conductors of different phases to respective switching tubes is manually operated by an operator, the proposed freewheel can be used to prevent excessive operation. Therefore, the operator can never move the rotatable drive shaft further than the freewheel allows. The operator receives audible feedback that he has reached the freewheel from the sound made when the tooth flanks alternately meet.

The term high voltage means preferably a voltage ranging from 36 to 1,100 kV. A high voltage preferably relates to nominal voltages in the range from above 72 kV to 550 kV, like 145 kV, 245 kV or 420 KV, or even more. Nominal currents of the disconnector or earthing switch can be in the range from 1 kA to 5 kA, even higher such as 80 kA for one second. The conductors can be part of a grid for distribution of said high voltage.

The rotatable drive shaft is preferably hold by two bearings, in between which the worm is provided on the drive shaft. The bearings can be attached to a housing of the disconnector or earthing switch. One end of the rotatable drive shaft is preferably configured for connecting to the motor or a manual handle for rotating the drive shaft so as the operating the disconnector or earthing switch. The three switching tubes can be provided as rods and/or can extend parallel to the rotatable drive shaft. The partially toothed worm wheel is preferably arranged on an output shaft, which axis extends orthogonal to the drive shaft. Said output shaft can be attached via another bearing to the housing. Partially toothed means preferably that at least a portion of a circumference of the worm wheel is provided without tooths, while the remaining portion is provided with tooths corresponding to the worm. Said portion without tooths is not in engagement with the worm. The worm can be provided as an external thread.

Thus, when the three respective switching tubes reach respectively approach the connected position or the disconnected position, tooths of the partially toothed worm wheel become unengaged with the worm. In the connected position or the disconnected position any continued rotation of the drive shaft does not result in a rotation of the partially toothed worm wheel respectively in any movement of the three respective switching tubes, as the partially toothed worm wheel is unengaged with the worm. However, for example, once the rotation of the drive shaft stops and the drive shaft is rotated in opposite direction, the re-engagement device ensures that the partially toothed worm wheel becomes again engaged with the worm.

Such wise there is no discrepancy in the wording that the partially toothed worm wheel is unengaged with the worm in the connected position and the disconnected position and that the re-engagement device again engages the partially toothed worm wheel with the worm in the connected position and the disconnected position. The re-engagement device is preferably triggered by the connected position and the disconnected position and/or when the connected position and the disconnected position is being reached to again engaging the partially toothed worm wheel with the worm.

According to a preferred implementation tooths of the partially toothed worm wheel extends about ≤180°, ≤160°, ≤140°, ≤120° or ≤100°. Thus, preferably >180°, >200°, >220°, >240° or >260° of the partially toothed worm wheel are provided free of tooths. The partially toothed worm wheel preferably comprises a disc-like form, whereby the tooths are arranged at a radial circumference. The tooths and the worm may comprise any suitable form allowing a respective mesh with each other.

In another preferred implementation the partially toothed worm wheel is provided as a pitch circle shaped disc having opposite end surfaces for engaging with the reengagement device. The pitch circle shaped disc may comprise a form of a piece of pie, with the tooths arranged along the circumference i.e. at the pieces. A remaining part i.e. where not pieces of pie are present can be hollow. The end surfaces preferably extend axial and radial to the output shaft as axis of the partially toothed worm wheel. The worm wheel is preferably rigidly connected to the output shaft. The end surfaces preferably engage with the re-engagement device in the connected position and the disconnected position for respectively triggering the re-engagement device for again engaging the partially toothed worm wheel with the worm.

According to another preferred implementation the re-engagement device is configured chargeable by the partially toothed worm wheel reaching the connected position respectively the disconnected position for again engaging the partially toothed worm wheel with the worm. Charging the re-engagement device means for example that a force is created at the re-engagement device which then allows for again engaging the partially toothed worm wheel with the worm.

In another preferred implementation the re-engagement device is provided as torsion spring and/or as compression spring configured for applying a spring force onto the partially toothed worm wheel and/or as repulsive magnet pair configured for applying a repulsive magnetic force onto the partially toothed worm wheel. The torsion spring can be housed in a torsion spring housing and may have two torsion spring legs, whereby each leg is for engaging the worm wheel with the worm in the connected position and in the disconnected position.

According to another preferred implementation the disconnector or earthing switch comprises a contact support holding the three switching tubes distant to each other and/or a guidance configured for guiding the axial movement of the respective switching tube. The contact support preferably extends parallel to the output shaft and/or orthogonal to the switching tubes and/or the rotatable drive shaft. The contact support may comprise a triangular-like form having three edges with one switching tube arranged at each one edge. The guidance can be provided as sliding contact for guiding and/or providing electrical connection to the respective switching tube.

In another preferred implementation the disconnector or earthing switch comprises a fork and bolt connection configured for translating a rotation of the partially toothed worm wheel into the axial movement of the three switching tubes. Preferably, the fork is rigidly connected to the output shaft, while the fork can be rigidly connected to another switching tube and/or a rod connected in parallel and stationary to the three switching tubes. Preferably, the switching tubes are connected by two opposite arranged bolts and two opposite arranged forks to the partially toothed worm wheel.

According to another preferred implementation each switching tube comprises a contact pin configured for connecting a contact tulip of the respective conductor. The contact pins are preferably arranged in regular distances to each other.

In another preferred implementation the three switching tubes are connected to ground. Such wise the three switching tubes are connected together and/or may comprise a common connector. Alternatively, the three switching tubes can be connected to a respective another conductor.

According to another preferred implementation the disconnector or earthing switch is provided as fast acting earthing switch, make proof earthing switch or disconnector earthing switch. The proposed solution thereby allows for installing the respective fast acting earthing switch, make proof earthing switch or disconnector earthing switch are very small installation spaces.

The object is further solved by a use of a partially toothed worm wheel for connecting three conductors of different phases to a respective switching tube, comprising

- a rotatable drive shaft comprising a worm and configured for operating the earthing switch,
- the three respective switching tubes, which are arranged axially together movable between a connected position configured for connecting the three conductors and a disconnected position configured for not connecting the three conductors,
- the partially toothed worm wheel configured for translating a rotation of the worm into the axial movement of the three switching tubes between the connected position and the disconnected position, whereby the partially toothed worm wheel is unengaged with the worm in the connected position and the disconnected position, and a re-engagement device configured for again engaging the partially toothed worm wheel with the worm in particular in the connected position and the disconnected position.

Further implementations and advantages of the use are directly and unambiguously derived by the person skilled in the art from the disconnector or earthing switch as described before.

BRIEF DESCRIPTION OF DRAWINGS

These and other aspects of the disclosure will be apparent from and elucidated with reference to the implementations described hereinafter.

In the drawings.

DETAILED DESCRIPTION

Figure 1:
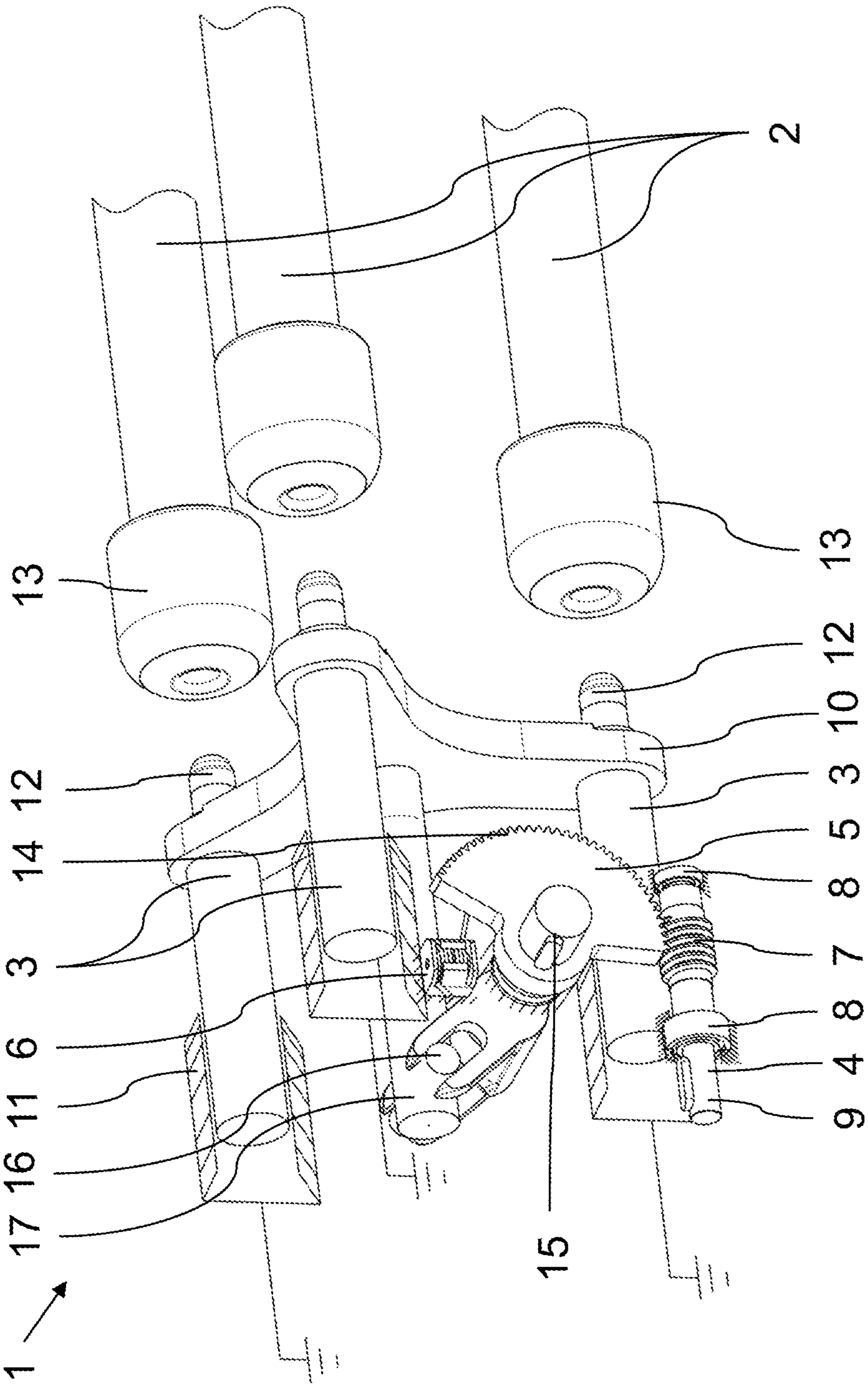
FIG. 1 shows a disconnector or earthing switch for connecting three conductors of different phases to a respective switching tube in a perspective view according to a preferred implementation.

FIG. 1 shows a disconnector or earthing switch 1 for connecting three conductors 2 of different phases to a respective switching tube 3 in a perspective view according to a preferred implementation. The three conductors 2 are part of grid each thus carry a high voltage in a range of 36 to 800 kV. The disconnector or earthing switch 1 comprises a rotatable drive shaft 4, the three respective switching tubes 3, a partially toothed worm wheel 5 and a re-engagement device 6.

The rotatable drive shaft 4 is equipped with a worm 7 firmly connected to the rotatable drive shaft 4. The rotatable drive shaft 4 is being hold by two bearings 8 at a housing, not shown, of the disconnector or earthing switch 1. The worm 7 is arranged between the two bearings 8. One end 9 of the rotatable drive shaft 4 is configured for being operated by a motor or a handle, not shown, for operating the disconnector or earthing switch 1.

The three switching tubes 3 extend parallel to the rotatable drive shaft 4 and are being hold by a contact support 10 having a triangular form with one switching tube 3 arranged at one edge each. The three switching tubes 3 are such wise motion coupled by the contact support 10 and being hold by guidances 11 provided as sliding contacts at the housing. All three guidances 11 are connected to ground as shown in the figure for the earthing switch 1. On case of a disconnector said three guidances 11 can be connected to other conductors.

The three guidances 11 allow that the three switching tubes 3 can be axially moved together between a connected position, in which each one switching tube 3 electrically connects each one conductor 2, not shown in FIG. 1, and a disconnected position, in which each one switching tube 3 is electrically disconnected from each one conductor 2, shown in FIG. 1. Each tip of the three switching tubes 3 therefore comprises a contact pin 12 and each tip of the three conductors 2 comprises a corresponding contact tulip 13.

Figure 2:
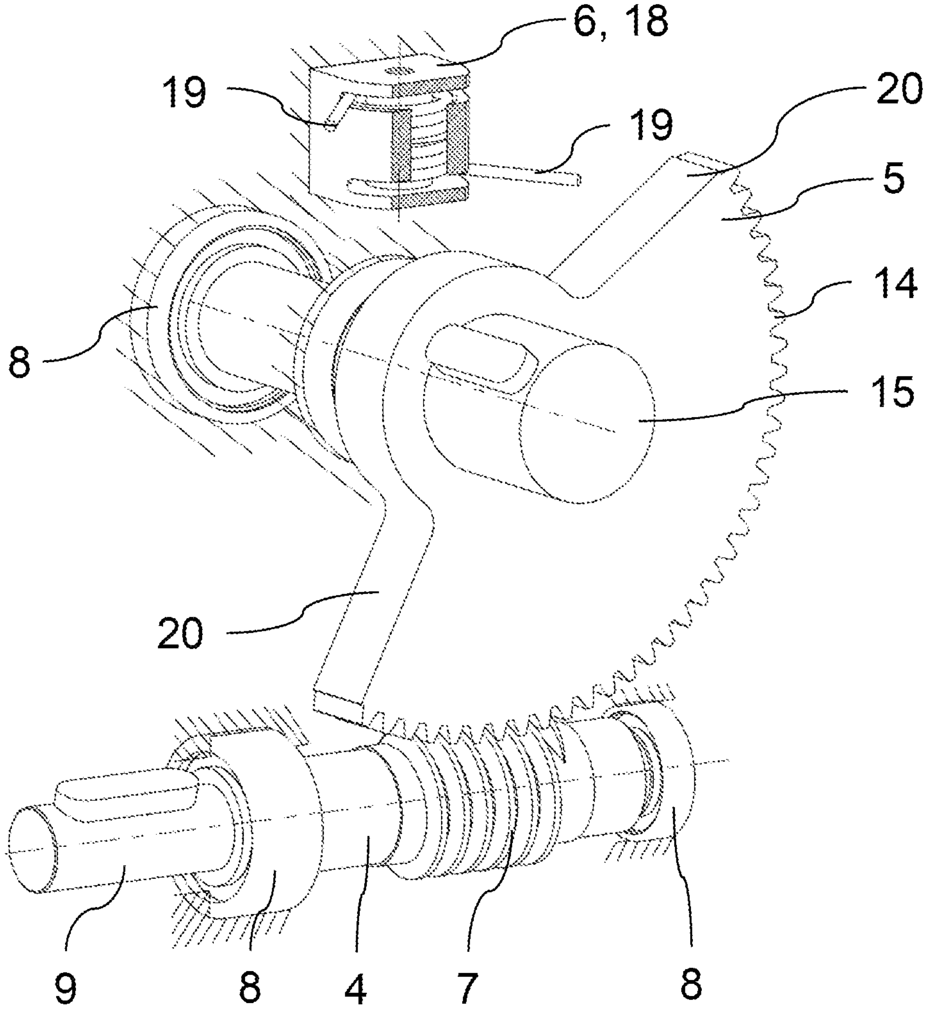
FIG. 2 shows a rotatable drive shaft and a partially toothed worm wheel of the disconnector or earthing switch according to FIG. 1 in a perspective view according to the preferred implementation.

For axially moving the three switching tubes 3, the worm 7 engages with tooths 14 of the partially toothed worm wheel 5, as shown in more detail in FIG. 2. The partially toothed worm wheel 5 comprises an output shaft 15, which is hold by the housing via anther bearing 8. Such wise the output shaft 15 extends orthogonal to the rotatable drive shaft 4.

Firmly connected to the output shaft 15 is a fork and bolt connection 16, which connects to the output shaft 15 to a rod 17 connected in parallel and stationary to the three switching tubes 3 to the contact support 10. Two opposite arranged bolts extend from the rod 17, which are encompassed by two respective opposite arranged forks connected to the output shaft 15. Such way a rotation of the rotatable drive shaft 4 is translated into an axial movement of the three switching tubes 3 for moving the three switching tubes between the connected position and the disconnected position.

Figure 3:
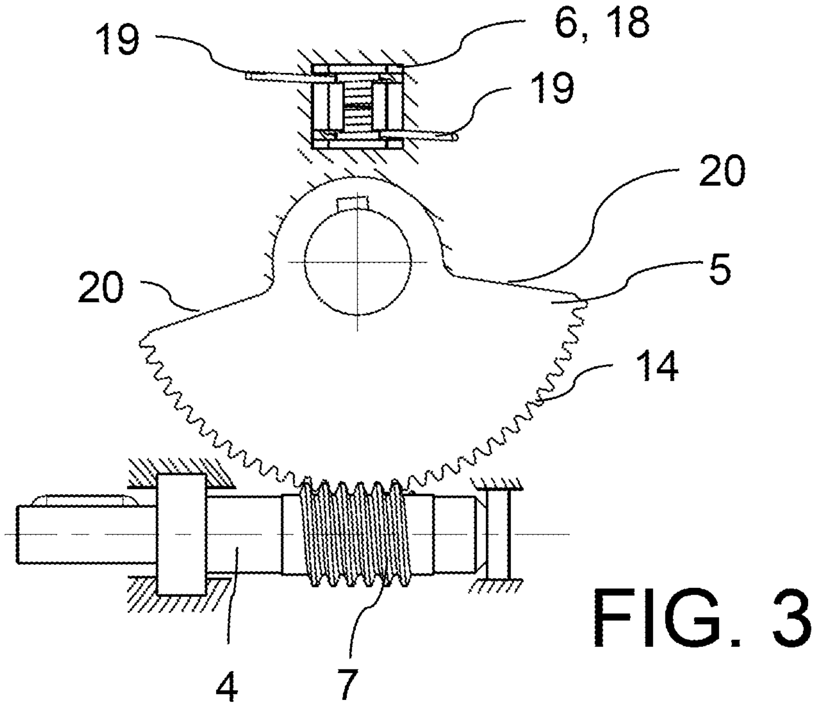
FIG. 3 shows the rotatable drive shaft and the partially toothed worm wheel of the disconnector or earthing switch according to FIG. 1 fully engaged in a side view according to the preferred implementation.

Now referring to FIGS. 2 to 6 showing the rotatable drive shaft 4 and the partially toothed worm wheel 5 of the disconnector or earthing switch 1 according to FIG. 1 according to the preferred implementation, FIGS. 2 and 3 show the rotatable drive shaft 4 and the partially toothed worm wheel 5 fully engaged i.e. tooths of the worm 7 engage with tooths 14 of the partially toothed worm wheel 5.

Said tooths 14 extend around 120° of a circumference of the partially toothed worm wheel 5. Thereby, the partially toothed worm wheel 5 is provided as a pitch circle shaped disc i.e. a piece of cake extending around 120°. Said pitch circle shaped disc comprises at its ends two opposite arranged end surfaces 20, which extend axial and radial in respect to the output shaft 15. In FIGS. 2 and 3 said end surfaces 20 do not engage with the re-engagement device 6

Figure 4:
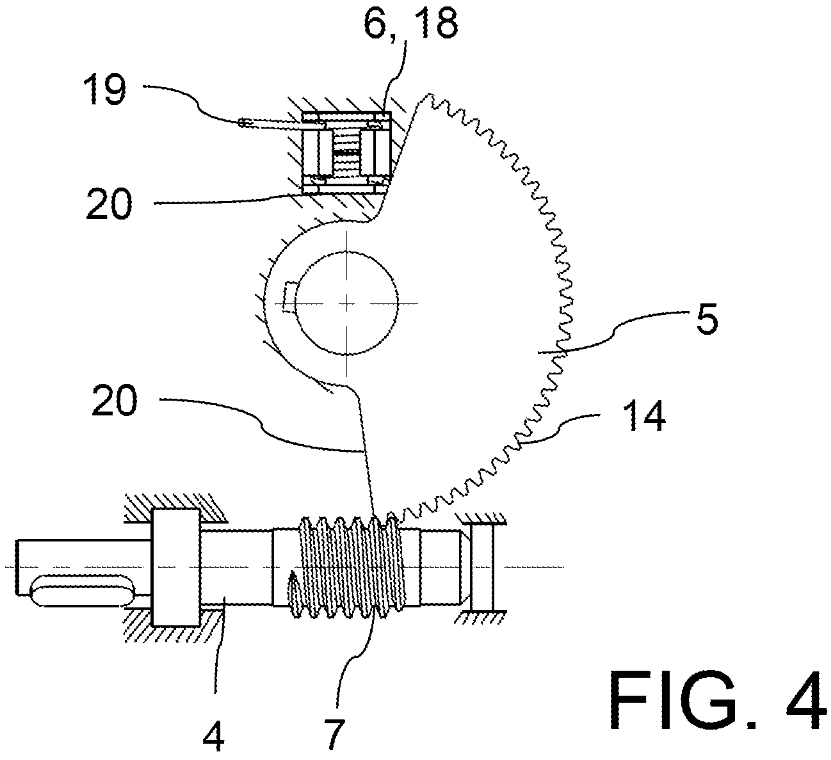
FIG. 4 shows the rotatable drive shaft and the partially toothed worm wheel of the disconnector or earthing switch according to FIG. 1 partially engaged in a side view according to the preferred implementation.

FIG. 4 shows the rotatable drive shaft 4 and the partially toothed worm wheel 5 of the disconnector or earthing switch 1 according to FIG. 1 partially engaged in a side view according to the preferred implementation approached the disconnected position in counterclockwise direction.

The re-engagement device 6, as can be seen in particular in FIG. 2, is provided as torsion spring having two spring legs 19 extending out of a torsion spring housing 18 of the re-engagement device 6 attached to the housing of the disconnector or earthing switch 1. It can be seen that, when the disconnected position is approached, one spring leg engages with one end surface 20 thereby loading the torsion spring respectively the re-engagement device 6 with a spring force.

Figure 5:
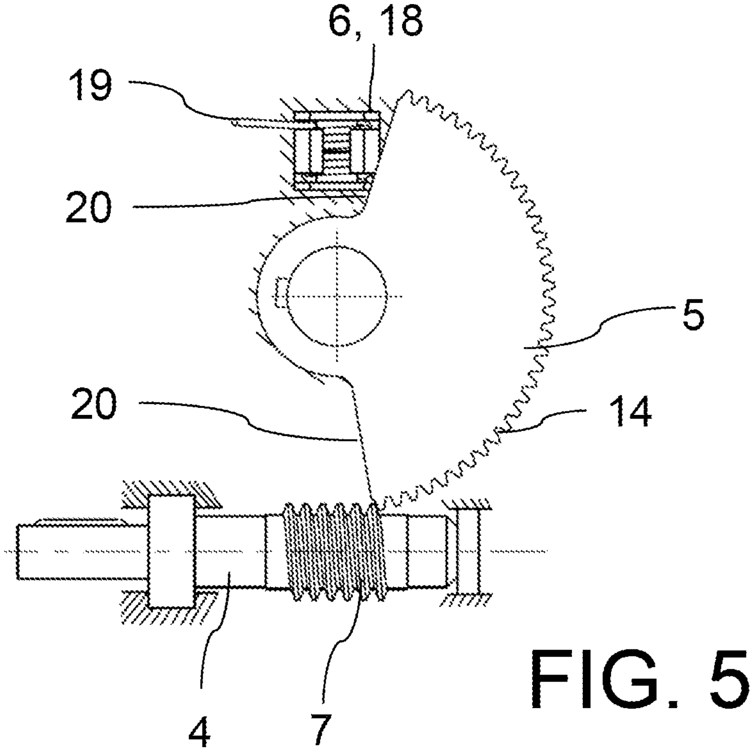
FIG. 5 shows the rotatable drive shaft and the partially toothed worm wheel of the disconnector or earthing switch according to FIG. 1 disengaged in a side view according to the preferred implementation.

FIG. 5 shows the rotatable drive shaft 4 and the partially toothed worm wheel 5 respectively the worm 7 and the tooths 14 fully disengaged in the disconnected position, while the torsion spring respectively the re-engagement device 6 is fully loaded with the spring force. Said spring force is directed in clockwise direction, opposite to the previous rotation direction of the partially toothed worm wheel 5. In addition, any further rotation of the rotatable drive shaft 4 does not result in an axial movement of the three switching tubes 3 anymore.

Figure 6:
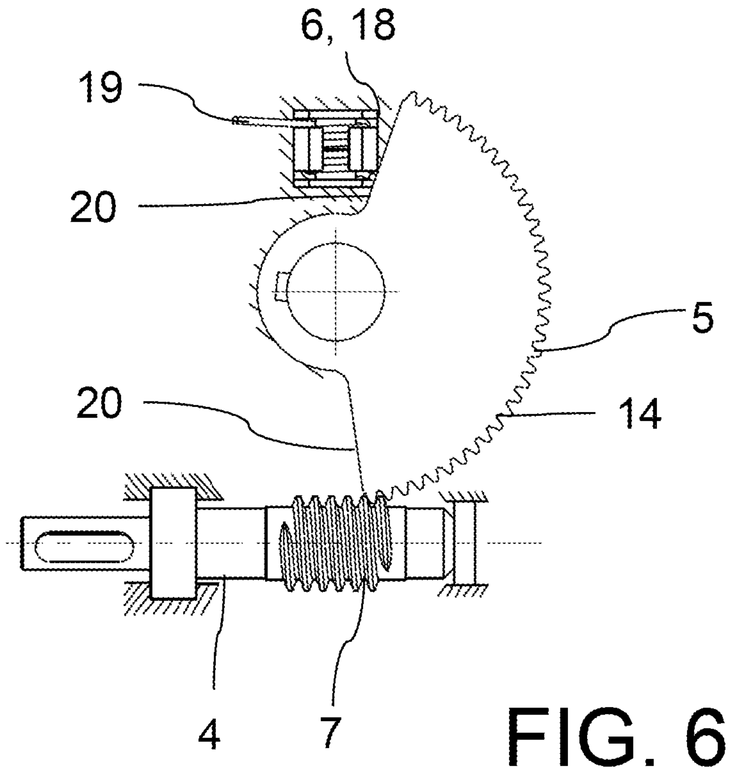
FIG. 6 shows the rotatable drive shaft and the partially toothed worm wheel of the disconnector or earthing switch according to FIG. 1 re-engaging in a side view according to the preferred implementation.

The spring force acting on the one end surface 20 then presses an outermost tooth flank of the partially toothed worm wheel 5 onto a tooth flank of a last tooth of the worm 7, as can be seen in FIG. 6. In an event of an intended clockwise movement of the partially toothed worm wheel 5, the re-engagement device 6 thus allows in the disconnected position for again engaging the partially toothed worm wheel 5 with the worm 7. The proposed solution makes it possible to restore engagement between the partially toothed worm wheel 5 and the worm 7 in the disconnected position, as well as in the connected position, not shown.

Figure 7:
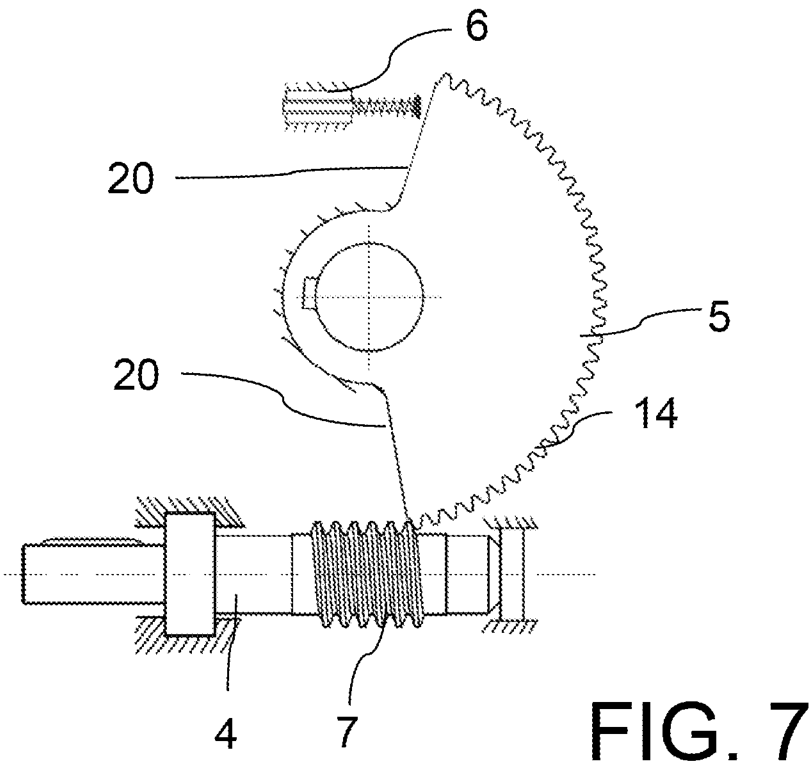
FIG. 7 shows the rotatable drive shaft and the partially toothed worm wheel of the disconnector or earthing switch according to FIG. 1 in a side view according to another preferred implementation.
Figure 8:
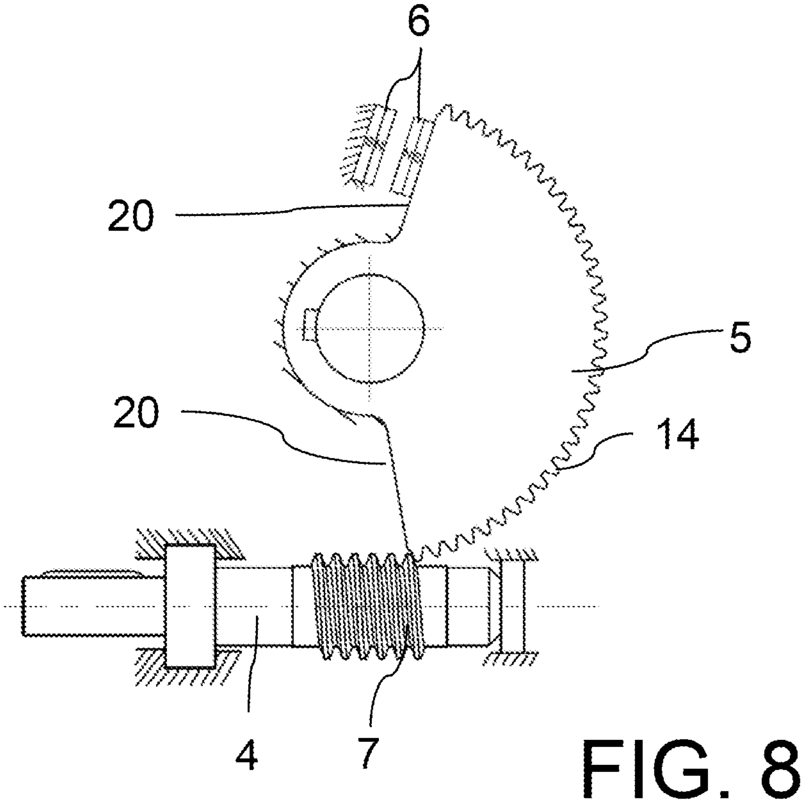
FIG. 8 shows the rotatable drive shaft and the partially toothed worm wheel of the disconnector or earthing switch according to FIG. 1 in a side view according to even another preferred implementation.

FIGS. 7 and 8 show the rotatable drive shaft 4 and the partially toothed worm wheel 5 of the disconnector or earthing switch 1 according to FIG. 1 in a side view according to two further preferred implementation. In FIG. 7, the re-engagement device 6 is provided as compression spring configured for applying a spring force onto the partially toothed worm wheel 5 and in FIG. 8, the re-engagement device 6 is provided as a repulsive magnet pair configured for applying a repulsive magnetic force onto the partially toothed worm wheel 5.

While the disclosure has been illustrated and described in detail in the drawings and foregoing description, such illustration and description are to be considered illustrative or exemplary and not restrictive; the disclosure is not limited to the disclosed implementations. Other variations to be disclosed implementations can be understood and effected by those skilled in the art in practicing the claimed arrangements, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 disconnector or earthing switch
2 conductor
3 switching tube
4 rotatable drive shaft
5 partially toothed worm wheel
6 re-engagement device
7 worm
8 bearing
9 end
10 contact support
11 guidance
12 contact pin
13 contact tulip
14 tooths
15 output shaft
16 fork and bolt connection
17 rod
18 torsion spring housing
19 spring leg
20 end surface

The invention claimed is:

1. A switch for connecting three conductors of different phases to a respective switching tube, comprising a rotatable drive shaft comprising a worm and configured for operating the switch, the three respective switching tubes, which are arranged axially together movable between a connected position configured for connecting the three conductors and a disconnected position configured for not connecting the three conductors, a partially toothed worm wheel configured for translating a rotation of the worm into the axial movement of the three switching tubes between the connected position and the disconnected position, whereby the partially toothed worm wheel is unengaged with the worm in the connected position and the disconnected position, and a re-engagement device configured for again engaging the partially toothed worm wheel with the worm in the connected position and the disconnected position.

2. The switch according to claim 1, whereby tooths of the partially toothed worm wheel extend 180° or less.

3. The switch according to claim 1, whereby tooths of the partially toothed worm wheel extend 100° or less.

4. The switch according to claim 1, whereby the partially toothed worm wheel is provided as a pitch circle shaped disc having opposite end surfaces for engaging with the re-engagement device.

5. The switch according to claim 1, whereby the re-engagement device is configured chargeable by the partially toothed worm wheel reaching the connected position for again engaging the partially toothed worm wheel with the worm.

6. The switch according to claim 1, whereby the re-engagement device is provided as a spring configured for applying a spring force onto the partially toothed worm wheel.

7. The switch according to claim 1, whereby the re-engagement device is provided as a repulsive magnet pair configured for applying a repulsive magnetic force onto the partially toothed worm wheel.

8. The switch according to claim 1, comprising a contact support holding the three switching tubes distant to each other and/or a guidance configured for guiding the axial movement of the respective switching tube.

9. The switch according to claim 1, comprising a fork and bolt connection configured for translating a rotation of the partially toothed worm wheel into the axial movement of the three switching tubes.

10. The switch according to claim 1, whereby each switching tube comprises a contact pin configured for connecting a contact tulip of the respective conductor.

11. The switch according to claim 1, whereby the three switching tubes are connected to ground.

12. The switch according to claim 1, whereby the switch is provided as a fast acting earthing switch, make proof earthing switch or disconnector earthing switch.

13. Use of a partially toothed worm wheel for connecting three conductors of different phases to a respective switching tube, comprising a rotatable drive shaft comprising a worm and configured for operating the switch, the three respective switching tubes, which are arranged axially together movable between a connected position configured for connecting the three conductors and a disconnected position configured for not connecting the three conductors, the partially toothed worm wheel configured for translating a rotation of the worm into the axial movement of the three switching tubes between the connected position and the disconnected position, whereby the partially toothed worm wheel is unengaged with the worm in the connected position and the disconnected position, and a re-engagement device configured for again engaging the partially toothed worm wheel with the worm in the connected position and the disconnected position.

14. A system comprising:

three conductors of different phases; and a switch comprising:

a rotatable drive shaft comprising a worm and configured for operating the switch, three switching tubes, each arranged axially together movable between a connected position configured for connecting the three conductors and a disconnected position configured for not connecting the three conductors, a partially toothed worm wheel configured for translating a rotation of the worm into the axial movement of the three switching tubes between the connected position and the disconnected position, whereby the partially toothed worm wheel is unengaged with the worm in the connected position and the disconnected position, and a re-engagement device configured for again engaging the partially toothed worm wheel with the worm in the connected position and the disconnected position.

15. The system according to claim 14, whereby tooths of the partially toothed worm wheel extend 180° or less.

16. The system according to claim 14, whereby tooths of the partially toothed worm wheel extend 100° or less.

17. The system according to claim 14, whereby the partially toothed worm wheel is provided as a pitch circle shaped disc having opposite end surfaces for engaging with the re-engagement device.

18. The system according to claim 14, whereby the re-engagement device is configured chargeable by the partially toothed worm wheel reaching the connected position for again engaging the partially toothed worm wheel with the worm.

19. The system according to claim 14, whereby the re-engagement device is provided as a spring configured for applying a spring force onto the partially toothed worm wheel.

20. The system according to claim 14, whereby the re-engagement device is provided as a repulsive magnet pair configured for applying a repulsive magnetic force onto the partially toothed worm wheel.

* * * * *